(12) United States Patent
Mart et al.

(10) Patent No.: US 6,649,803 B2
(45) Date of Patent: Nov. 18, 2003

(54) SLURRY HYDROCARBON SYNTHESIS WITH ISOMERIZATION ZONE IN EXTERNAL LIFT REACTOR LOOP

(75) Inventors: Charles John Mart, Baton Rouge, LA (US); Robert Jay Wittenbrink, Kingwood, TX (US); Janet Renee Clark, Baton Rouge, LA (US); Jennifer Schaefer Feeley, Lebanon, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 101 days.

(21) Appl. No.: 09/992,390

(22) Filed: Nov. 6, 2001

(65) Prior Publication Data

US 2003/0088138 A1 May 8, 2003

(51) Int. Cl.[7] .............................. C07C 5/22; C07C 1/04
(52) U.S. Cl. .................. 585/734; 585/310; 585/315; 585/899; 208/950; 518/700; 518/728
(58) Field of Search ................... 585/734, 310, 585/315, 899; 208/950; 518/700, 728

(56) References Cited

U.S. PATENT DOCUMENTS

| 4,423,265 A | * | 12/1983 | Chu et al. ................ 585/322 |
|---|---|---|---|
| 4,471,145 A | * | 9/1984 | Chu et al. ................ 585/322 |
| 4,523,047 A | * | 6/1985 | Chester et al. ............ 585/322 |
| 4,832,819 A | | 5/1989 | Hamner ..................... 208/27 |
| 5,382,748 A | * | 1/1995 | Behrmann et al. .......... 585/899 |
| 5,811,468 A | | 9/1998 | Chang et al. ............. 518/700 |
| 5,811,469 A | * | 9/1998 | Leviness et al. .......... 518/700 |
| 5,821,270 A | | 10/1998 | Chang et al. ............. 518/700 |
| 5,866,621 A | | 2/1999 | Behrmann et al. ......... 518/706 |

OTHER PUBLICATIONS

Crynes, et al, Monolith Froth Reactor: Development of a Novel Three–Phase Catalytic System, AIChE Journal, vol. 41, No.2, pp. 337–345 (Feb. 1995).

* cited by examiner

Primary Examiner—Walter D. Griffin
(74) Attorney, Agent, or Firm—Mark D. Marin

(57) ABSTRACT

A slurry Fischer-Tropsch hydrocarbon synthesis process for synthesizing liquid hydrocarbons from synthesis gas in a synthesis reactor also hydroisomerizes the synthesized hydrocarbons in one or more external lift reactor hydroisomerizing loops outside of the reactor, but which are a part of the reactor. A monolithic catalyst is used for the hydroisomerization and slurry circulation between the synthesis reactor and one or more loops is achieved, at least in part, by the lift action of a hydrogen treat gas injected into each loop.

25 Claims, 4 Drawing Sheets

SLURRY HYDROCARBON SYNTHESIS WITH ISOMERIZATION ZONE IN EXTERNAL LIFT REACTOR LOOP

BACKGROUND OF THE DISCLOSURE

1. Field of the Invention

The invention relates to a slurry hydrocarbon synthesis process which includes isomerization in an external lift reactor loop. More particularly the invention relates to a slurry Fischer-Tropsch type of hydrocarbon synthesis process, in which the synthesized hydrocarbon slurry liquid in the synthesis reactor is circulated through an external lift reactor, in which it reacts with hydrogen in a the presence of a monolithic hydroisomerization catalyst, to hydroisomerize the liquid and reduce its pour point. The hydroisomerized liquid is then passed back into the synthesis reactor.

2. Background of the Invention

The slurry Fischer-Tropsch hydrocarbon synthesis process is now well known and documented, both in patents and in the technical literature. This process comprises passing a synthesis gas, which comprises a mixture of $H_2$ and CO, up into a hot reactive slurry comprising synthesized hydrocarbons which are liquid at the synthesis reaction conditions and in which is dispersed a particulate Fischer-Tropsch type of catalyst. The $H_2$ and CO react in the presence of the catalyst and form hydrocarbons. The hydrocarbon liquid is continuously or intermittently withdrawn from the reactor and pipelined to one or more downstream upgrading operations. The upgraded products may include, for example, a syncrude, various fuels and lubricating oil fractions and wax. The downstream upgrading includes fractionation and conversion operations, typically comprising hydroisomerization, in which a portion of the molecular structure of at least some the hydrocarbon molecules is changed. It would be an improvement if the synthesized hydrocarbon slurry liquid could be hydroisomerized to reduce its pour and melt points, which make it more transportable by pipeline, before it is pipelined to downstream operations.

SUMMARY OF THE INVENTION

The invention relates to a slurry Fischer-Tropsch type of hydrocarbon synthesis process, in which a portion of the synthesized hydrocarbon slurry liquid is passed out of the synthesis reactor and into one or more external lift reactors, in which it reacts with hydrogen in the presence of a hydroisomerization catalyst, and preferably a monolithic hydroisomerization catalyst, to hydroisomerize the liquid, which is then passed back into the three-phase slurry (main slurry body) in the reactor. The slurry liquid, which comprises synthesized hydrocarbons that are liquid at the synthesis reaction conditions, comprises mostly normal paraffins and the hydroisomerization reduces its pour and melt points, thereby making it more pumpable and pipelinable. The external lift reactor may comprise a simple vertical, hollow fluid conduit or tube. In operation, hot slurry from the main slurry body, is contacted with means for removing gas bubbles, and preferably both gas bubbles and particulate solids from the slurry liquid which, along with a hydrogen treat gas, is then passed out of the synthesis reactor and up into the one or more lift reactors. The hydroisomerizing catalyst is located in the interior of the lift reactor and comprises the hydroisomerizafion zone. Thus, synthesized hydrocarbon liquid is passed out of the synthesis reactor, up into and through the interior of the lift reactor and back into the synthesis reactor. The hydrogen or hydrogen treat gas injected up into the lift reaction zone, acts as a lift gas to provide circulation of the slurry liquid between the synthesis reactor and the external tube. The slurry circulation up into and out of the lift reactor is achieved by the lifting action of the hydrogen treat gas and, therefore, the external hydroisomerization reactor may be regarded as a form of lift tube or gas lift reactor. The lift reactor is in fluid communication with the main slurry body inside the synthesis reactor, by means of upper and lower conduit portions opening into respective upper and lower portions of the reactor. This enables hydroisomerization of the slurry liquid (i) in an external reaction loop which depends from, and which may therefore be considered as part of the synthesis reactor and (ii) while the synthesis reactor is producing hydrocarbons, but without interfering with the synthesis reaction. The concentration of hydroisomerized hydrocarbon liquid in the synthesis reactor continues to increase until equilibrium conditions are reached. When the synthesis reaches equilibrium, it is possible for the slurry liquid in it to comprise mostly hydroisomerized hydrocarbons of reduced pour point. In some cases, no further hydroisomerization of the liquid hydrocarbon product withdrawn from the synthesis reactor will be necessary. Thus, the process of the invention will reduce and in some cases even eliminate the need for a separate, stand-alone hydroisomerization reactor and associated equipment, downstream of the synthesis reactor. If a downstream hydroisomerization reactor is needed, it will be smaller than it would be if the synthesized hydrocarbon liquid passed into it was not at least partially hydroisomerized. While all of the hydroisomerized hydrocarbon liquid is typically returned back into the main slurry body with which it mixes, in some embodiments a portion of the hydroisomerized liquid will be passed from the lift tube reactor directly to downstream operations.

The use of one or more external hydroisomerization loops associated with the synthesis reactor permits the hydroisomerization temperature to be different (e.g., higher) from that in the synthesis reaction zone. A higher hydroisomerization temperature enables the use of a less expensive, non-noble metal hydroisomerization catalyst. The gas bubble and preferably the slurry gas bubble and solids removal means is preferably located within the main slurry body and may comprise the same or separate means. While various filtration means may be used to separate the slurry liquid from at least a portion of the catalyst particles before the slurry liquid is passed up into the hydroisomerization zone, in the practice of the invention the use of filtration means may be avoided by using known slurry solids reducing means that do not employ filtration. Gas bubble and solids removing means suitable for use with the present invention are known and disclosed in, for example, U.S. Pat. Nos. 5,866,621 and 5,962,537, the disclosures of which are incorporated herein by reference. Simple gas bubble removing means are disclosed in U.S. Pat. Nos. 5,382,748; 5,811, 468 and 5,817,702, the disclosures of which are also incorporated herein by reference. Removing gas bubbles from the slurry also densifies it and, if properly used in association with feeding the densified slurry liquid into the hydroisomerization zone (e.g., via a downcomer in the slurry body in the synthesis reactor), will provide a density-difference hydraulic head to assist circulation of the slurry liquid up through the lift reactor. Removing gas bubbles from the slurry prior to hydroisomerization also reduces the CO and water vapor content of the flowing fluid, which could otherwise react with the hydroisomerization hydrogen and also adversely effect the hydroisomerization catalyst. A monolithic hydroisomerization catalyst having a minimal solid cross-sectional area perpendicular to the flow direction of the fluid, minimizes the pressure drop of the fluid flowing up and across the catalyst surface. Removing catalyst and other solid particles, such as inert heat transfer particles, from the slurry upstream of the hydroisomerization zone, reduces scouring of the monolithic catalyst, plugging of the hydroisomerization reaction zone in the tube and also reduces the liquid phase viscosity.

In a broad sense, the process of the invention comprises a slurry Fischer-Tropsch hydrocarbon synthesis process, in which a portion of the hydrocarbon slurry liquid is removed from the slurry body in the synthesis reactor, reduced in gas bubble content and passed up into and through a hydroisomerization zone in a lift reactor external of, and in fluid communication with, the synthesis reactor, in which it reacts with hydrogen in the presence of a hydroisomerization catalyst, at reaction conditions effective to hydroisomerize the hydrocarbon liquid and reduce its pour point, with at least a portion of the hydroisomerized liquid passed back into the main slurry body in the synthesis reactor. Preferably, both gas bubbles and particulate solids are removed from the slurry liquid before it contacts the hydroisomerization catalyst. In a still further embodiment, the invention comprises the steps of:

(i) passing a synthesis gas comprising a mixture of $H_2$ and CO into a main slurry body comprising a three-phase slurry in a slurry Fischer-Tropsch hydrocarbon synthesis reactor, in which the slurry comprises gas bubbles and a particulate hydrocarbon synthesis catalyst in a slurry hydrocarbon liquid, at reaction conditions effective for said $H_2$ and CO to react in the presence of the catalyst and form hydrocarbons, a portion of which are liquid at the reaction conditions and comprise the slurry liquid;

(ii) withdrawing a portion of slurry from the main slurry body;

(iii) contacting the withdrawn slurry with means for removing gas bubbles, to form a slurry hydrocarbon liquid reduced in gas bubbles;

(iv) passing hydrogen and the liquid formed in (iii) into a hydroisomerizing zone in a lift reactor external of, in fluid communication with and depending from, the synthesis reactor, in which they contact a hydroisomerization catalyst and preferably a monolithic hydroisomerization catalyst;

(v) reacting the hydrogen and liquid in the presence of the hydroisomerizing catalyst to hydroisomerize at least a portion of the liquid to form a liquid of reduced pour point, and (vi) passing all or a portion of the hydroisomerized liquid back into the synthesis reactor.

DETAILED DESCRIPTION

Figure 1:
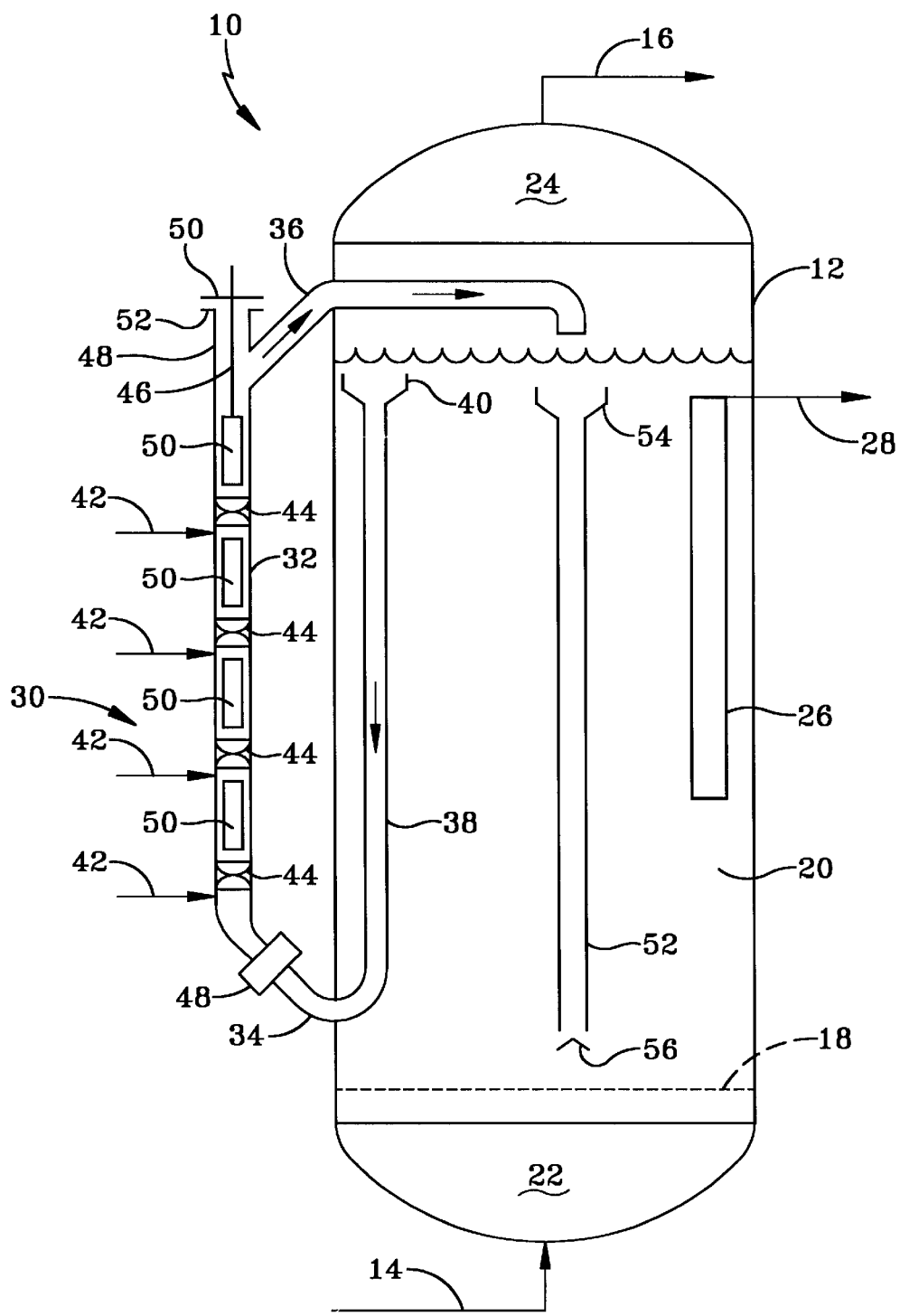
FIG. 1 is a simple schematic flow diagram of a hydrocarbon synthesis reactor, to which is attached an external riser reaction loop containing a monolithic hydroisomerization catalyst within, according to one embodiment of the invention.

The waxy slurry liquid synthesized in the synthesis reactor will typically comprise 500° F.+ hydrocarbons, most of which have an initial boiling point in the 650–750° F.+ range. The end boiling point will be at least 850° F., preferably at least 1050° F. and even higher (1050° F.+). This liquid also comprises mostly (more than 50 wt. %), typically more than 90 wt. %, preferably more than 95 wt. % and more preferably more than 98 wt. % paraffinic hydrocarbons, most of which are normal paraffins, and this is what is meant by "paraffinic" in the context of the invention, particularly when the hydrocarbon synthesis catalyst comprises a cobalt catalytic component. The exact boiling range, hydrocarbon composition, etc, are determined by the catalyst and process variables used for the synthesis. It has negligible amounts of sulfur and nitrogen compounds (e.g., less than 1 wppm). Slurry liquids having these properties and useful in the process of the invention have been made using a slurry Fischer-Tropsch process with a catalyst having a catalytic cobalt component. It is also preferred that the synthesis reaction have a Schulz-Flory alpha of at least 0.90, as higher molecular weight hydrocarbons are preferred in most cases. In the practice of the invention, it is preferred that the slurry Fischer-Tropsch hydrocarbon synthesis catalyst comprise a catalytic cobalt or iron component. The gas bubbles in the slurry comprise synthesis gas, vapor and gaseous products of the synthesis reaction, such as $C_1$–$C_4$ hydrocarbons, and especially methane, $CO_2$ and water vapor. The hydroisomerization catalyst is adversely effected by water vapor. Therefore, in addition to densifying the slurry, gas bubble removal is also beneficial to the downstream hydroisomerizing catalyst.

The hydroisomerization catalyst will have a both a hydrogenation/dehydrogenation function and an acid hydrocracking function for hydroisomerizing the normal paraffinic hydrocarbons in the slurry hydrocarbon liquid. The hydrocracking functionality of the catalyst results in the conversion of some of the waxy slurry liquid to lower boiling material. Using an external hydroisomerization reaction zone means that the hydroisomerization reaction temperature is not limited to that in the hydrocarbon synthesis reactor. Therefore, the hydroisomerization reaction temperature may range from 300–900° F. and preferably 550–750° F., compared to a typically 320–600° F. temperature range in the hydrocarbon synthesis reactor. However, the pressure in the hydroisomerization reaction zone will be about the same as that in the hydrocarbon synthesis reactor and will typically range from 80–600 psig. The hydrogen treat gas rate will be from 500–5000 SCF/B, with a preferred range of 2000–4000 SCF/B. By hydrogen or hydrogen treat gas is meant all hydrogen or preferably at least 60 vol. % hydrogen and an inert diluent gas, such as argon or methane. Excess hydrogen is employed during the hydroisomerization to insure an adequate hydrogen partial pressure and to prevent any CO remaining in the upflowing liquid from adversely effecting the hydroisomerization reaction and catalyst. The hydroisomerizafion catalyst comprises one or more Group VIII catalytic metal components supported on an acidic metal oxide support to give the catalyst both a hydrogenation function and an acid function for hydroisomerizing the hydrocarbons. At relatively low hydroisomerizing temperatures, such as those in a hydrocarbon synthesis reactor, the catalytic metal component will typically comprise a Group VIII noble metal, such as Pt or Pd, and preferably Pt. However, at the higher temperatures which can be employed with the process of the invention, it is preferred that the catalytic metal component comprise one or more less expensive non-noble Group VIII metals, such as Co, Ni and Fe, which will typically also include a Group VIB metal (e.g., Mo or W) oxide promoter. The catalyst may also have a Group IB metal, such as copper, as a hydrogenolysis suppressant. The Groups referred to herein refer to Groups as found in the Sargent-Welch Periodic Table of the Elements copyrighted in 1968 by the Sargent-Welch Scientific Company. The cracking and hydrogenating activity of the catalyst is determined by its specific composition, as is known. In a preferred embodiment the catalytically active metal comprises cobalt and molybdenum. The acidic oxide support or carrier may include silica, alumina, silica-alumina, silica-alumina-phosphates, titania, zirconia, vanadia, and other Group II, IV, V or VI oxides, as well as Y sieves, such as ultra stable Y sieves. Preferred supports include silica, alumina and silica-alumina and, more preferably silica-alumina in which the silica concentration in the bulk support (as opposed to surface silica) is less than about 50 wt. %, preferably less than 35 wt. % and more preferably 15–30 wt. %. Lower hydroisomerization temperatures require a more active catalyst and therefore a more acidic support than do higher temperatures. In such cases, for example, a conventional silica-alumina support component may not have enough acidity and crystalline alumina-silicas will be preferred, such as beta sieves in which the silica to alumina ratio ranges from less than 50:1 to less than 20:1. As is known, if the support is alumina, small amounts of fluorine or chlorine are often incorporated into it to increase the acid functionality. However, in the process of the invention, the use of halogens in the catalyst is to be avoided, to prevent potential impairment of the hydrocarbon synthesis catalyst.

Hydroisomerization can be enhanced by using noble metal containing catalysts in at least one hydroisomerization zone within the downcomer reactor and non-noble metal containing catalysts in at least one other hydroisomerization zone within the downcomer reactor.

A hydroisomerization catalyst that is particularly preferred in the practice of the invention, if temperatures higher than those in the synthesis reactor and amenable to this catalyst are employed in the lift reactor, comprises both cobalt and molybdenum catalytic components supported on an amorphous, low silica alumina-silica support, and most preferably one in which the cobalt component is deposited on the support and calcined before the molybdenum component is added. This catalyst will contain from 10–20 wt. % $MoO_3$ and 2–5 wt. % CoO on an amorphous alumina-silica support in which the silica content ranges from 20–30 wt. % of the support. This catalyst has been found to have good selectivity retention and resistance to deactivation by the oxygenates typically found in Fischer-Tropsch produced waxy feeds. The addition of a copper component suppresses hydrogenolysis. The preparation of this catalyst is disclosed in, for example, U.S. Pat. Nos. 5,757,920 and 5,750,819, the disclosures of which are incorporated herein by reference.

Monolithic catalysts are known for automotive exhausts and for chemical reactions as is shown, for example, in an article by Crynes, et al., "Monolithic Froth Reactor: Development of a novel three-Phase Catalytic System", AIChE J, v. 41, n. 2, p. 337–345 (Feb. 1995). A corrugated type of monolithic catalyst has even been suggested for Fischer-Tropsch hydrocarbon synthesis (GB 2,322,633 A). Basically monolithic catalysts comprise a ceramic or metal support structure of a desired shape, with a catalyst applied to its surface. The monolith may be a metal foam or may be prepared from the catalyst composition itself or from the catalyst support, e.g., molecular sieves, with the catalytic metal(s) deposited onto the monolith support. In this latter case, monolith attrition will still leave catalyst available for the hydroisomerization reaction. Preferred channel sizes for monoliths are in the range >300 $\mu$m and less than 600 $\mu$m. Very high strength monolithic catalysts may be fabricated from a metal foundation, over which is applied a suitable ceramic and then the catalyst. The catalytic material may be a finished catalyst which has been ground up to a small particle size, slurried in an appropriate liquid, such as water or an organic liquid, with the slurry then applied to the monolithic support surface as a wash coat and calcined. It is also possible to apply one or more applications of catalytic precursor materials to the ceramic support by impregnation or incipient wetness, followed by drying and calcining. In the practice of the invention, a monolithic catalyst having a minimal solid cross-sectional area perpendicular to the fluid flow direction is preferred, to minimize the pressure drop of the fluid flowing across the catalytic surface. Such catalysts is will not be limited to containing substantially longitudinal and parallel fluid flow channels. However, since pressure drop across the catalyst is important, this must be taken into consideration. The actual shape and size of the monolith must be determined experimentally. Micron size channel openings or openings on the order of a few microns will not be large enough for this application but openings generally exceeding 300 microns would be acceptable. Suitable shapes for providing a low pressure drop include an open cell foam structure, and configurations having a low cross-sectional area perpendicular to the fluid flow direction may also be used. Such shapes will include, for example, elongated star shapes, with and without an outer peripheral wall, corrugated constructions, with longitudinal channels parallel to the fluid flow direction and the like. Many of these shapes may be extruded from a preceramic paste, dried and then fired to the green or final state, to provide the foundation for the catalyst material. Still further, all or some of the monolithic catalysts used in the hydroisomerization zone may be shaped in the form of a low pressure drop static mixer, such as a Kenics® static mixer in the form of slightly twisted or spiral-shaped metal strips. A monolithic catalyst having this shape may be prepared by applying a ceramic over a twisted metal strip and then applying or forming the catalyst on the ceramic. The advantage of this is to provide more intimate mixing of hydrogen and liquid and to prevent stratification of the gas and liquid flows as they flow down through the hydroisomerizing zone.

In the practice of the invention, the hydroisomerization zone in the lift reactor will preferably comprise a plurality of monoliths vertically arrayed on top of each other in the hydroisomerization zone. For example, in the case of a lift reactor comprising an elongated and substantially vertical hollow conduit, such as a pipe, a plurality of cylindrical monoliths may be vertically arranged or arrayed along the vertical axis inside the lift reactor conduit, to form the hyroisomerization zone. The cross-sectional area of the catalyst monoliths perpendicular the direction of fluid flow will typically proximate that of the interior of the conduit. It is preferred that there be vertical spaces between at least some of the monoliths, to prevent stratification of the gas and liquid as they flow up through the zone. More preferably, a low pressure drop static mixer, such as a Kenics® static mixer, will be placed in the space between at least some of the arrays, to insure adequate mixing and remixing of the hydrogen treat gas and slurry liquid, as they flow up through the zone. Still further, as mentioned above, some or all of the catalyst monoliths themselves may be in the form of a low pressure drop static mixer, to insure good mixing and low pressure drop. It is preferred to inject the hydrogen or hydrogen treat gas into the hydroisomerization zone via a plurality of gas injection means, vertically spaced apart along the hydroisomerization zone. This will provide better mixing of the upflowing fluid and the hydrogen, and reduce the extent of any stratification. Still further, it is more preferred that the hydrogen be injected into such spaces upstream of one or more low pressure drop static mixers in the hydroisomerization zone, to mix the injected gas into the upflowing liquid at each gas injection point. As mentioned above, the hydroisomerized slurry liquid will typically be sent to further processing downstream of the synthesis reactor and this will typically include fractionation and one or more conversion operations which may or may not include additional hydroisomerization. The invention will be further understood with reference to the Figures.

Referring to FIG. 1, a slurry hydrocarbon synthesis reactor 10 is shown as comprising a cylindrical vessel 12 with a synthesis gas feed line 14 at the bottom and a gas product line 16 at the top. A synthesis gas comprising a mixture of $H_2$ and CO is introduced into the plenum space 22 at the bottom of the vessel via feed line 14 and then injected up through a gas injection means, briefly illustrated by dashed line 18, and into the three-phase slurry 20, which comprises bubbles of the uprising synthesis gas and solid particles of a Fischer-Tropsch catalyst in a hydrocarbon slurry liquid, which comprises synthesized hydrocarbons that are liquid at the temperature and pressure in the reactor. Suitable gas injection means comprises a plurality of gas injectors horizontally arrayed across and extending through an otherwise gas and liquid impermeable horizontal tray or plate, as is disclosed for example, in U.S. Pat. No. 5,908,094 the disclosure of which is incorporated herein by reference. The $H_2$ and CO in the slurry react in the presence of the particulate catalyst to form predominantly paraffinic hydrocarbons, most of which are liquid at the reaction conditions, particularly when the catalyst includes a catalytic cobalt component. Unreacted synthesis gas and gas products of the hydrocarbon synthesis reaction rise up and out the top of the slurry and into the gas collection space 24 in the top of the reactor, from where they are removed from the hydrocarbon synthesis reactor as tail gas, via line 16. A filter means immersed in the slurry, which is simply indicated by box 26, separates the hydrocarbon liquid in the reactor from the catalyst particles and passes the synthesized and hydroisomerized hydrocarbon liquid out of the reactor via line 28. Filter 26 may be fabricated of sintered metal, wound wire and the like to separate the liquid product from the particulate solids in the slurry, and the slurry liquid removed via line 28 is typically sent to further processing or sold as a highly refined syncrude of reduced pour point. Not shown is means for overhead removal and replacement of the filter. An external lift reactor loop 30 is shown as a hollow liquid conduit comprising a vertical lift portion 32, with slurry entrance and exit conduit portions 34 and 36 passing inside the synthesis reactor, as shown. While only one such hydroisomerization loop is shown for convenience, a plurality of such loops may be employed. The fluid entrance conduit 34 turns up inside the synthesis reactor and extends up proximate to the top of the slurry, as a hollow, vertical conduit 38, which has a fluid entrance comprising a slurry gas disengaging means 40 at its top. Means 40 is wholly immersed in the main slurry body 20 as shown and comprises an upwardly opening cup. Means 40 is located in the upper portion of the slurry, to maximize the hydraulic head of the gas-reduced slurry liquid and also because the particulate solids concentration is least at the top of the slurry. Since the concentration of catalyst particles is least at the top of the slurry, locating 40 proximate the top minimizes the concentration of particulate solids in the downflowing, gas-bubble reduced slurry liquid. In this particular illustration, for simplicity cup 40 is of the type disclosed in U.S. Pat. No. 5,382,748 referred to above. The flow rate of a gas bubble-reduced slurry down through a vertical downcomer can be substantial and, when used to feed the degassed slurry liquid to the lift reactor, adds to the relatively high flow rate created by the lift action of the hydrogen treat gas injected into the bottom hydroisomerizing zone in the lift reactor. In some cases this higher flow rate created by the combination of downcomer and lifting action of hydrogen or hydrogen treat gas will be neither needed nor desired. This is at the discretion of the practitioner and will be depend on (i) the desired liquid flow rate and (ii) the pressure drop across the hydroisomerization catalyst, as well as the height of the lift reactor. In an experiment with a 30 foot tall slurry hydrocarbon synthesis reactor, using a simple gas disengaging cup on top of a vertical downcomer pipe of the type disclosed in U.S. Pat. No. 5,382,748, resulted in a 12 ft/sec liquid flow rate down a 3 inch downcomer pipe, from which only half of the 60 vol. % of gas bubbles had been removed.

A hydrogen treat gas is injected up into the lift reactor conduit 32, via a plurality of gas injection lines 42, to provide the hydroisomerization hydrogen. In this embodiment, the hydrogen or hydrogen treat gas in injected into the lift reactor upstream of each section of monolithic catalyst 50, as shown. Further, a low pressure drop static mixing means 44 is shown downstream of each gas injection point, but upstream of each monolithic catalyst section, to insure intimate mixing of the upflowing gas and slurry hydrocarbon liquid and to minimize gas-liquid stratification and gas channeling during hydroisomerization. While only a simple degassing means is illustrated for the sake of simplicity, it is preferred that the means 40 both degas and reduce the solids content of the slurry, before it passes down through 38, particularly if the synthesis reactor is not operating in a slumped bed mode. Simple gas, and preferably gas and solids disengaging means, such as those disclosed in the '621 and '537 patents referred to above, are preferred to means such as conventional filters, magnetic or centrifugal solids separating means, because they do not require pumps, expensive or complex equipment. They also provide a density-difference hydraulic head to assist circulation of the slurry from the synthesis reactor up into and out of hydroisomerization loop 30. A rod 46 or other suitable means attached to the monolithic catalyst sections extends up through a catalyst removal port 48, shown as an upper extension of 32. The rod 46 is attached to a removable plate 50, by means of a flange 52, enabling removal and replacement of the catalyst. The catalyst sections and static mixers will be fixed together as a removable unit. Plate 50 is attached to flange 52 by bolts. Gas bubble removal in means 40 densifies the slurry liquid, thereby imparting a hydraulic head to the gas-bubble reduced slurry liquid flowing down 38. The gas reduced, and preferably the gas and solids reduced slurry, passes down through conduit 38 and through a heat exchanger which is shown as box 48, in which it is either heated or cooled (more typically heated) by indirect heat exchange means. Either steam or water is typically used as the heat exchange fluid. Not shown is an indirect heat exchange means associated with the fluid exit conduit 36, for cooling the hot hydroisomerized liquid, before it passes back into the cooler synthesis reactor. The extent of the hydrocarbon liquid hydroisomerization per pass through the loop will vary with the type of catalyst, the amount of catalytic surface area, reaction conditions, hydrogen gas and hydrocarbon liquid flow rate, the amount of residual water and CO, if any, remaining in the liquid, the concentration of normal paraffinic components in the hydrocarbon liquid, etc. As the slurry liquid continues to circulate through the hydroisomerizing loop, the slurry liquid is typically intermittently or continuously withdrawn from the unit via line 28 and the degree of overall isomerization in the main slurry body will eventually reach an equilibrium condition. The hydroisomerized hydrocarbon liquid passes back into the synthesis reactor 12 via conduit 36 which, in this embodiment extends laterally into the synthesis reactor and terminates above one or more known, simple mixing downcomers 52, of the type disclosed in the '748 patent having gas disengaging means 54 at the top and a simple baffle proximate the bottom. This enhances both the uniformity of the slurry catalyst distribution in the synthesis reactor and mixing of the hydroisomerized slurry with the main slurry body, while minimizing flow of the hydroisomerized liquid back into the hydroisomerizing zone before it mixes with the main slurry body. A plurality of such mixing downcomers may be employed. If desired, a portion of the hydroisomerized liquid may be withdrawn from the external loop, with the remainder passing back into the synthesis reactor. The hydrocarbon liquid removed from the hydrocarbon synthesis reactor via line 28 comprises a mixture of mostly 650–750° F.+ boiling normal paraffinic and isoparaffinic hydrocarbons, particularly when the synthesis catalyst comprises a catalytic cobalt component. Not shown are heat exchange means in the synthesis reactor for removing heat to maintain the reactor temperature at the desired synthesis reaction temperature.

Figure 4:
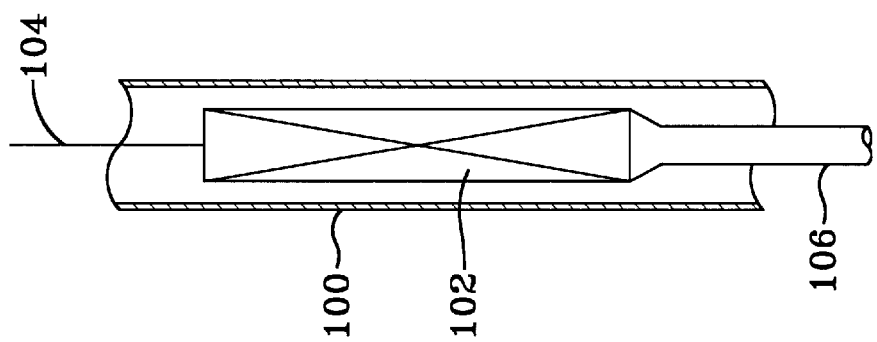
FIG. 4 is a schematic side view of a filter means in a downcomer useful in the process of the invention.
Figure 3A:
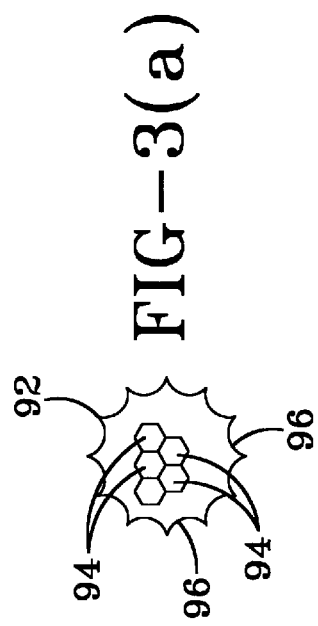
FIGS. 3 (a) and 3 (b) are respective top plan and side schematic views of a monolithic catalyst body.
Figure 3B:
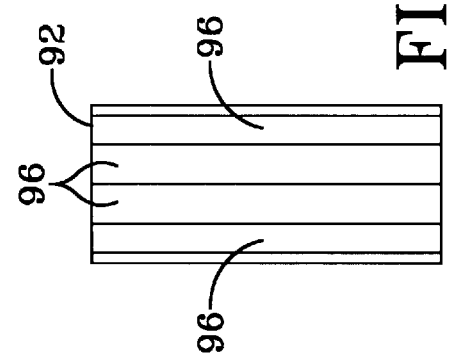
Figure 2:
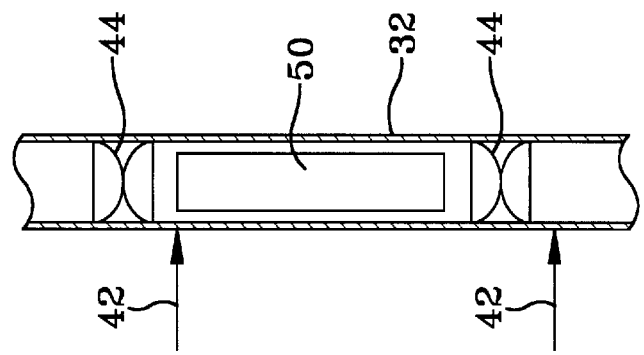
FIG. 2 is a schematic side view of a section of the external riser containing a catalyst section and two static mixers.

FIG. 2 is a brief and simplified schematic side view of a portion of the hydroisomerizing zone in riser 32 containing a single monolithic catalyst body or a single catalyst zone comprising a plurality of monolith bodies represented by 50. Low pressure drop static mixers 44 are located just upstream of each gas injection point upstream of each body and/or zone. Even if hydrogen was not introduced upstream of each static mixer, the static mixer will reestablish an intimate gas and liquid mixture, before it is passed through an upstream monolithic. FIGS. 3 (a) and 3 (b) are a top plan view and a side schematic view of a monolithic catalyst body form suitable for use with the invention, which comprises a hexagonal close packed honeycomb 92. A plurality of vertical, hexagonal channels 94 extend down through the monolith, each of an equivalent diameter of about ½ inch. The outer, circumferential periphery 96 of the monolith is fluted to increase the outer catalytic surface area. Hexagonal close packing maximizes the area to mass ratio. However and as mentioned above, there are many other shapes that can be used. Turning now to FIG. 4, there is shown a section of a hollow cylindrical downcomer 100, of the type shown in FIG. 1, terminating at its upper end in a simple gas disengaging cup (not shown) immersed in the slurry liquid in the synthesis reactor, of the type 54 for downcomer 52. A cylindrical, hollow filter means 102 is positioned in its interior and held in place by a simple rod 104 or other suitable means, along with means (not shown) for upward removal and replacement of the filter means (not shown), similar to that for the monolithic catalyst bodies in the lift reactor. The outer surface of 102 is pervious to liquid, but not the slurry solids. The slurry having been densified by gas bubble removal and containing particulate solids, rushes down the downcomer tube 100 and past the filter 102, in the space between the inner wall of 100 and the outer wall of 102, and then down and out of the bottom of the downcomer, as shown in FIG. 1 for downcomer 52. As the slurry liquid flows past the filter, a portion is separated from the particulate solids, by passing through to the filter interior as filtrate. The relatively high velocity of the densified slurry flowing down past the outer surface of the filter prevents a build-up of a filter cake comprising the particulate slurry solids on its outside surface. The filtrate, which is now both a gas and solids-reduced slurry liquid, passes down and out of the bottom of the filter, which terminates in the downcomer 106, flows down 106 and up into lift reactor 32. If required or desired, a solids removing means can also be used at the top of downcomer conduit 100.

It is known that in a Fischer-Tropsch hydrocarbon synthesis process, liquid and gaseous hydrocarbon products are formed by contacting a synthesis gas comprising a mixture of $H_2$ and CO with a Fischer-Tropsch catalyst, in which the $H_2$ and CO react to form hydrocarbons under shifting or non-shifting conditions and preferably under non-shifting conditions in which little or no water gas shift reaction occurs, particularly when the catalytic metal comprises Co, Ru or mixture thereof Suitable Fischer-Tropsch reaction types of catalyst comprise, for example, one or more Group VIII catalytic metals such as Fe, Ni, Co and Ru. In one embodiment the catalyst comprises catalytically effective amounts of Co and one or more of Ru, Fe, Ni, Th, Zr, Hf, U, Mg and La on a suitable inorganic support material, preferably one which comprises one or more refractory metal oxides. Preferred supports for Co containing catalysts comprise titania, particularly when employing a slurry hydrocarbon synthesis process in which higher molecular weight, primarily paraffinic liquid hydrocarbon products are desired. Useful catalysts and their preparation are known and illustrative, but nonlimiting examples may be found, for example, in U.S. Pat. Nos. 4,568,663; 4,663,305; 4,542,122; 4,621,072 and 5,545,674. Fixed bed, fluid bed and slurry hydrocarbon synthesis processes are well known and documented in the literature. In all of these processes the synthesis gas is reacted in the presence of a suitable Fischer-Tropsch type of hydrocarbon synthesis catalyst, at reaction conditions effective to form hydrocarbons. Some of these hydrocarbons will be liquid, some solid (e.g., wax) and some gas at standard room temperature conditions of temperature and pressure of 25° C. and one atmosphere, particularly if a catalyst having a catalytic cobalt component is used. A slurry Fischer-Tropsch hydrocarbon synthesis process is often preferred, because they are able to produce relatively high molecular weight, paraffinic hydrocarbons when using a cobalt catalyst.

In a slurry hydrocarbon synthesis process conducted under nonshifting conditions, which is the process used in the practice of the invention, the mole is ratio of the $H_2$ to CO in the synthesis gas may broadly range from about 0.5 to 4, but the stoichiometric consumption mole ratio is typically about 2.1/1. The synthesis gas comprising a mixture of $H_2$ and CO is injected or bubbled up into the bottom of the slurry body in the synthesis reactor, in which the $H_2$ and CO react in the presence of the particulate Fischer-Tropsch hydrocarbon synthesis catalyst in the slurry liquid, at conditions effective to form hydrocarbons, a portion of which are liquid at the reaction conditions and which comprise the hydrocarbon slurry liquid. The synthesized hydrocarbon liquid is separated from the catalyst particles as filtrate by means such as simple filtration, although other separation means can be used. Some of the synthesized hydrocarbons are vapor and pass out of the hydrocarbon synthesis reactor as overheads or tail gas, along with unreacted synthesis gas and gaseous reaction products. Some of these overhead hydrocarbon vapors are typically condensed to liquid and combined with the hydrocarbon liquid filtrate. Thus, the initial boiling point of the filtrate will vary depending on whether or not some of the condensed hydrocarbon vapors have been combined with it. Slurry hydrocarbon synthesis process conditions vary somewhat depending on the catalyst and desired products. Typical conditions effective to form hydrocarbons comprising mostly $C_{5+}$ paraffins, (e.g., $C_{5+}-C_{200}$) and preferably $C_{10+}$ paraffins, in a slurry hydrocarbon synthesis process employing a catalyst comprising a supported cobalt component include, for example, temperatures, pressures and hourly gas space velocities in the range of from about 320–600° F., 80–600 psi and 100–40,000 V/hr/V, expressed as standard volumes of the gaseous CO and $H_2$ mixture (60° F., 1 atm) per hour per volume of catalyst, respectively.

The hydrocarbons which are liquid at the synthesis reaction conditions and which comprise the slurry liquid product which is hydroisomerized by the process of the invention, are typically fractionated, with one or more of the resulting fractions receiving one or more additional conversion operations. By conversion is meant one or more operations in which the molecular structure of at least a portion of the hydrocarbon is changed and includes both noncatalytic processing (e.g., steam cracking), and catalytic processing in which a fraction is contacted with a suitable catalyst, with or without the presence of hydrogen or other coreactants. If hydrogen is present as a reactant, such process steps are typically referred to as hydroconversion and include, for example, additional hydroisomerization, hydrocracking, hydrorefining and the more severe hydrorefining referred to as hydrotreating. Illustrative, but nonlimiting examples of suitable products formed by upgrading include one or more of a synthetic crude oil, liquid fuel, olefins, solvents, lubricating, industrial or medicinal oil, waxy hydrocarbons, nitrogen and oxygen containing compounds, and the like. Liquid fuel includes one or more of motor gasoline, diesel fuel, jet fuel, and kerosene, while lubricating oil includes, for example, automotive, jet, turbine and metal working oils. Industrial oil includes well drilling fluids, agricultural oils, heat transfer fluids and the like.

The invention will be further understood with reference to the Examples below.

EXAMPLES
Example 1

Four bifunctional monolithic hydroisomerization catalysts, each consisting of an acidic cracking component and a hydrogenation/dehydrogenation metal component, were prepared using cylindrically shaped and commercially available, open cell alpha alumina foam as the monolith support. The alumina foam cylinders were each 0.5 inches in diameter and 1 inch long. Two different cell sizes were used, one having 20 pores per inch (ppi) and the other having 65 ppi. The average pore sizes were about 1000 μm and 300 μm. Two different zeolites were used as the acidic components, to make two different hydroisomerization catalysts. These zeolites were LZY-82 and zeolite beta. Each zeolite was first impregnated with 0.5 wt. % Pt using standard incipient wetness techniques, dried, and calcined at 400° C. for 4 hours. The zeolite materials were slurried in water/acetic acid (5%) and then applied onto the alpha alumina foam as washcoats using multiple dips followed by calcination (600° C. for 2 hours). The four finished monolithic catalysts are summarized in Table 1.

TABLE 1

| Catalyst Description | Monolith Volume in.$^3$ | Average Loading g/in.$^3$ |
|---|---|---|
| Pt(beta (20 ppi) | 0.196 | 1.82 |
| Pt(beta (65 ppi) | 0.196 | 1.78 |
| Pt/LZY-82 (20 ppi) | 0.196 | 1.35 |
| Pt/LZY-82 (65 ppi) | 0.196 | 1.67 |

Example 2

These four catalysts were evaluated for their hydroconversion effectiveness for heavy, waxy, paraffinic hydrocarbons using hexadecane (n-$C_{16}H_{38}$) as a representative feed for a Fischer-Tropsch synthesized hydrocarbon liquid. The hydroconversion runs were carried out in a small, up-flow pilot plant running at a hydrogen pressure and nominal treat rate of 750 psig and 2500 SCF/B with weight hourly space velocity (WHSV) ranging from 2.3 to 3.1. The degree of conversion was varied by adjusting the temperature from 400–550° F. Each reactor was charged with 5 of the cylindrical catalytic monoliths in series with alpha alumina foams of similar ppi rating used at the front and back of the reaction zone. The reactor conditions for each run are summarized in Table 2.

TABLE 2

| Feedstock<br>Catalyst<br>Description | Hexadecane<br>0.5 wt. %<br>Pt/Beta (20 ppi) | Hexadecane<br>0.5 wt. %<br>Pt/Beta (65 ppi) | Hexadecane<br>0.5 wt. %<br>Pt/LZY (20 ppi) | Hexadecane<br>0.5 wt. %<br>Pt/LZY (20 ppi) |
|---|---|---|---|---|
| Conditions | | | | |
| WHSV, g/hr/g | 2.3 | 2.4 | 3.1 | 2.5 |
| Temp., ° F. | | 400–500 | | |
| $H_2$ rate, SCF | | 2500 | | |
| Feed, grs/hr | | 4.1 | | |

Figure 5:
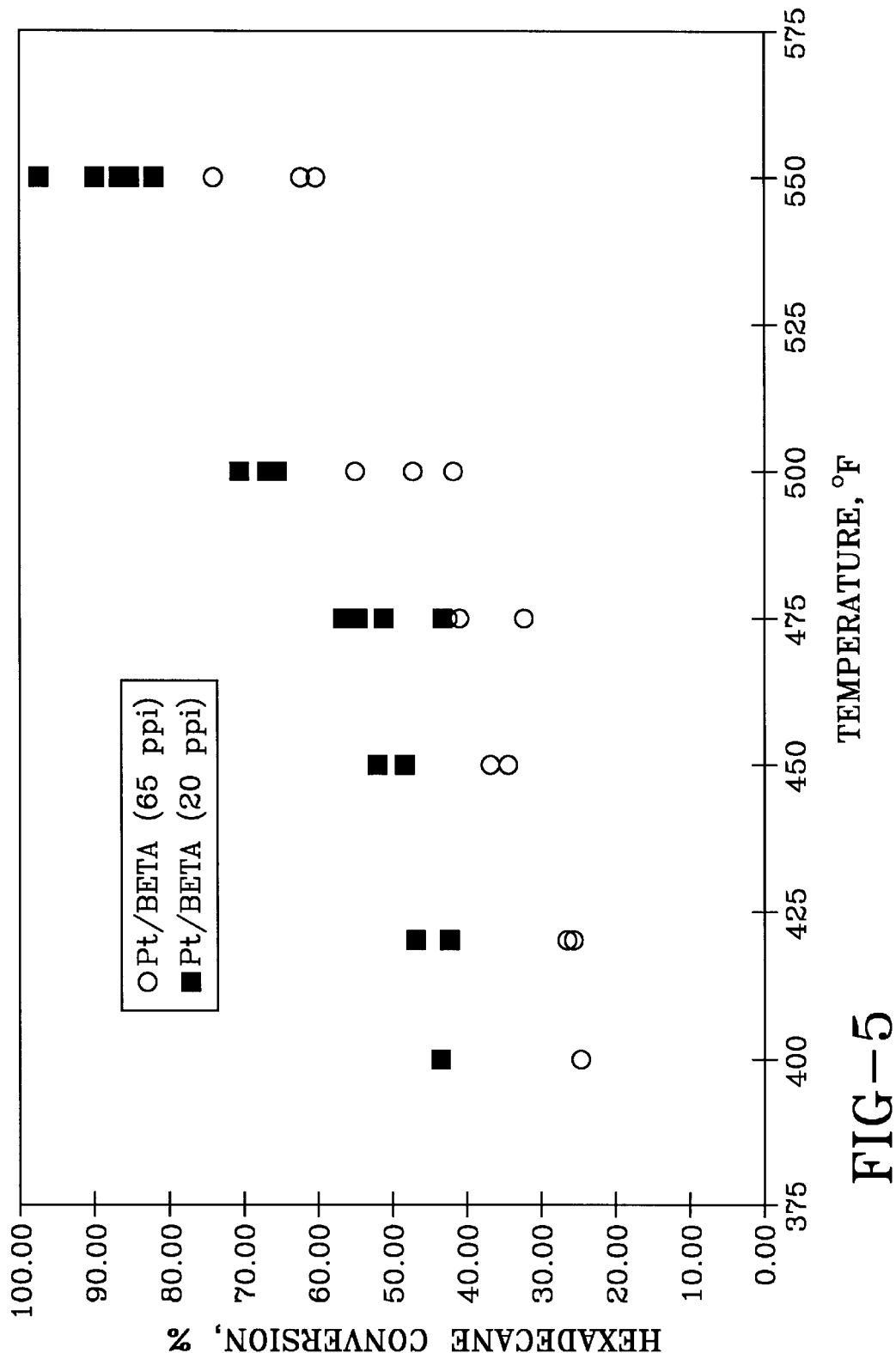
FIG. 5 is a plot of hexadecane conversion as a function of temperature in the presence of a monolithic hydroisomerization catalyst in a pilot plant tubular reactor
Figure 6:
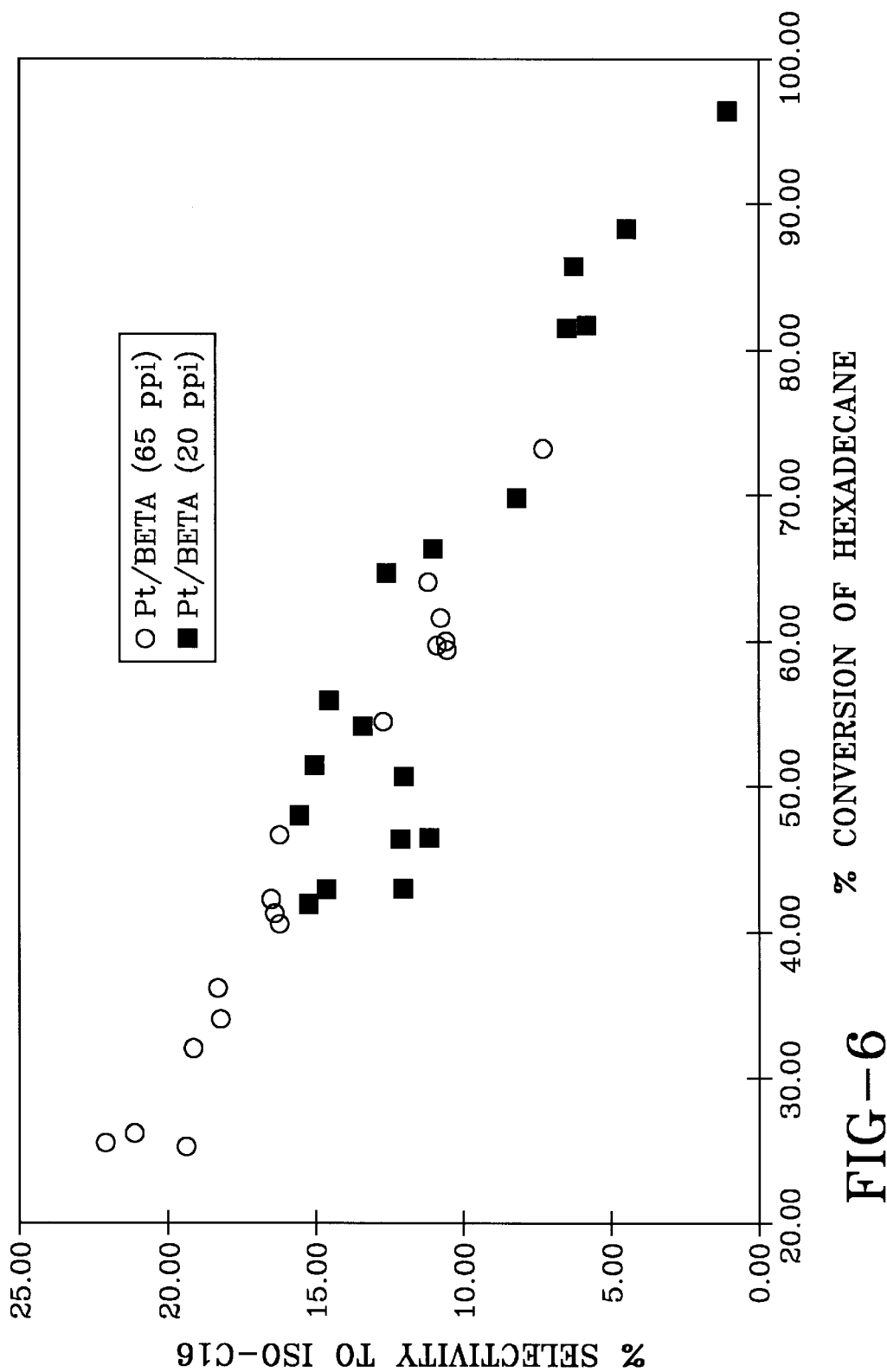
FIG. 6 is a graph illustrating hexadecane hydroisomerization selectivity over a monolithic hydroisomerization catalyst in a pilot plant tubular reactor.

The results of the runs are shown in FIGS. 5 and 6. FIG. 5 is a plot of hexadecane conversion as a function of temperature, using the Pt/Beta catalysts. FIG. 6 is a plot of the selectivity of the hexadecane conversion to $C_{16}$ isoparaffins, determined by gas chromatography, as a function of the reactor temperature for the Pt/Beta catalysts. The results for the Pt/LZY-82 catalysts are not shown, because this catalyst was essentially inactive, even at the relatively lo high temperature of 550° F. The results for the Pt/Beta catalysts shown in FIG. 6 clearly demonstrate the conversion of the hexadecane to isoparaffin. While the cracking activity of the catalysts was greater than desired, the results nevertheless demonstrate the efficacy of hydroisomerizing n-paraffins to isoparaffins using a monolithic hydroisomerization catalyst.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A process for hydroisomerizing the slurry hydrocarbon liquid produced in a slurry Fischer-Tropsch hydrocarbon synthesis reactor, while said reactor is producing said liquid from a synthesis gas and wherein said slurry comprises gas bubbles and catalyst particles in said liquid, said process comprising:
   (a) contacting a portion of said slurry with means for removing gas bubbles, to produce a gas bubble reduced slurry;
   (b) passing a hydrogen treat gas and said gas bubble reduced slurry into, up and through one or more gas lift reactors external of said synthesis reactor and in fluid communication with said slurry therein, each said gas lift reactor containing a hydroisomerization reaction zone;
   (c) reacting said gas bubble reduced slurry and hydrogen in the presence of said catalyst, at reaction conditions effective to hydroisomerize at least a portion of said liquid and produce a hydroisomerized liquid, and
   (d) passing all or a portion of said hydroisomerized liquid back into said synthesis reactor in which it mixes with said slurry therein and forms part of said slurry liquid.

2. A process according to claim 1 wherein there is more than one gas lift reactor.

3. A process according to claim 2 wherein at least one gas lift reactor contains noble metal containing hydroisomerization catalyst and wherein at least one other gas lift reactor contains non-noble metal hydroisomerization catalyst.

4. A process according to claim 1 wherein said treat gas also acts as a lift gas to produce circulation of said slurry through said lift reactors.

5. A process according to claim 4 wherein said slurry hydrocarbon liquid is intermittently or continuously withdrawn as product liquid from said synthesis reactor, while said synthesis reactor is producing said hydrocarbon slurry liquid.

6. A process according to claim 5 wherein, in addition to gas bubble removal, at least a portion of said catalyst particles are also removed from said slurry before it is passed up into said hydroisomerization zone.

7. A process according to claim 6 wherein said hydroisomerization catalyst comprises a monolithic catalyst.

8. A process according to claim 7 wherein said hydroisomerization catalyst is in the form of a monolith.

9. A process according to claim 7 wherein said monolithic catalyst comprises a plurality of monolithic catalyst bodies vertically arrayed in said zone.

10. A process according to claim 9 wherein at least a portion of said slurry liquid removed from said synthesis reactor said reactor is passed to at least one upgrading operation comprising at least fractionation and/or one or more conversion operations.

11. A process according to claim 10 wherein said one or more lift reactors are connected to and depend from said synthesis reactor.

12. A process according to claim 11 wherein at least a portion of said monolithic bodies are vertically spaced apart in said hydroisomerization zone.

13. A process according to claim 12 wherein said hydrogen treat gas is passed into said zone by at least two separate gas injection means vertically spaced apart along said zone, each upstream of a monolithic catalyst body.

14. A process according to claim 13 wherein a static mixing means is is located in at least a portion of said spaces between said monolithic bodies.

15. A process according to claim 14 wherein at least a portion of said hydrogen is injected into said hydroisomerization zone upstream of at least one of said mixing means.

16. A process according to claim 15 wherein said gas bubbles and particulate solids are removed from said slurry by gas bubble and solids removing means immersed in said slurry in said synthesis reactor.

17. A process according to claim 16 wherein said gas bubbles and particulate solids are removed from said slurry liquid in said synthesis reactor and upstream of said hydroisomerizing zone by density difference.

18. A process according to claim 17 wherein said gas bubble reduced slurry liquid is fed into said lift reactor by a downcomer means immersed in said slurry in said synthesis reactor.

19. Slurry hydrocarbon synthesis process which includes hydroisomerizing hydrocarbon liquid produced by the synthesis reaction while said hydrocarbon liquid is being produced from a synthesis gas comprises the steps of:
   (a) passing said synthesis gas comprising a mixture of $H_2$ and CO into a slurry body comprising a three-phase slurry in a slurry Fischer-Tropsch hydrocarbon synthesis reactor, in which said slurry comprises gas bubbles and a particulate hydrocarbon synthesis catalyst in a slurry hydrocarbon liquid;
   (b) reacting said $H_2$ and CO in said synthesis reactor in the presence of said catalyst at reaction conditions effective to and form hydrocarbons, a portion of which are liquid at the reaction conditions and comprise said slurry hydrocarbon liquid;
   (c) contacting a portion of said slurry from said slurry body with means for removing gas bubbles, to form a slurry hydrocarbon liquid reduced in gas bubbles;
   (d) passing a hydrogen treat gas and said gas bubble reduced hydrocarbon liquid formed in (c) up into a hydroisomerizing zone in one or more lift reactors external of, in fluid communication with and depending from, said synthesis reactor, in which they react in the presence of a monolithic hydroisomerization catalyst to form a hydroisomerized hydrocarbon liquid of reduced pour point, and wherein said treat gas also acts as a lift gas to produce circulation of said slurry from said synthesis reactor through said one or more lift reactors, and
   (e) passing all or a portion of said pour point reduced liquid back into said synthesis reactor wherein it mixes with said slurry body therein.

20. A process according to claim 19 wherein said slurry hydrocarbon liquid is intermittently or continuously withdrawn as product liquid from said synthesis reactor, while it is producing said hydrocarbon slurry liquid and wherein at least a portion of said product liquid is passed to at least one upgrading operation comprising at least fractionation and/or one or more conversion operations.

21. A process according to claim 20 wherein said gas bubble reduced slurry is passed through heat exchange means to change its temperature to a value different than that in said synthesis reactor, before it reacts with said hydrogen in said hydroisomerization zone.

22. A process according to claim 21 wherein said monolithic hydroisomerization catalyst comprises a plurality of vertically arrayed monolithic catalyst bodies, at least a portion of which are vertically spaced apart.

23. A process according to claim 22 wherein said hydrogen treat gas is passed into said zone by at least two separate gas injection means vertically spaced apart along said zone, each upstream of a monolithic catalyst body.

24. A process according to claim 23 wherein solid particles are also removed from said slurry, before said slurry liquid contacts said hydroisomerization catalyst and wherein said gas bubbles and particulate solids are removed from said slurry by gas bubble and solids removing means immersed in said slurry body.

25. A process according to claim 24 wherein a static mixing means is located in at least a portion of said spaces between said catalyst bodies.

* * * * *